(12) United States Patent
Morilhat et al.

(10) Patent No.: US 11,613,192 B2
(45) Date of Patent: Mar. 28, 2023

(54) HEIGHT-ADJUSTABLE AND LONGITUDINALLY ADJUSTABLE HEADREST

(71) Applicant: ADIENT ENGINEERING AND IP GMBH, Burscheid (DE)

(72) Inventors: Philippe Morilhat, Kertzfeld (FR); Felix Manduzio, Illkirch-Graffenstaden (FR); Christophe Moriniere, Holtzheim (FR)

(73) Assignee: Adient US LLC, Plymouth, MI (US)

(*) Notice: Subject to any disclaimer, the term of this patent is extended or adjusted under 35 U.S.C. 154(b) by 0 days.

(21) Appl. No.: 16/973,944

(22) PCT Filed: Jun. 6, 2019

(86) PCT No.: PCT/EP2019/064752
§ 371 (c)(1),
(2) Date: Dec. 10, 2020

(87) PCT Pub. No.: WO2019/238516
PCT Pub. Date: Dec. 19, 2019

(65) Prior Publication Data
US 2021/0245639 A1    Aug. 12, 2021

(30) Foreign Application Priority Data

Jun. 11, 2018 (DE) .................. 10 2018 209 291.5
Jun. 11, 2018 (DE) .................. 10 2018 209 292.3

(51) Int. Cl.
*B60N 2/818* (2018.01)
*B60N 2/865* (2018.01)
*B60N 2/829* (2018.01)

(52) U.S. Cl.
CPC ............ *B60N 2/818* (2018.02); *B60N 2/865* (2018.02); *B60N 2/829* (2018.02); *B60N 2205/20* (2013.01)

(58) Field of Classification Search
CPC ........ B60N 2/818; B60N 2/865; B60N 2/829; B60N 2205/20; B60N 2/806
See application file for complete search history.

(56) References Cited

U.S. PATENT DOCUMENTS 5,330,228 A * 7/1994 Krebs .................. B60N 2/829
                                               280/801.2
7,631,930 B2 * 12/2009 Muller .................. B60N 2/20
                                               297/61

(Continued)

FOREIGN PATENT DOCUMENTS

| CN | 102717735 A | 10/2012 |
| JP | S5962016 A | 4/1984 |

(Continued)

OTHER PUBLICATIONS

European Patent Office, International Search Report with Written Opinion, issued in PCT/EP2019/064752, dated Sep. 2, 2019, 21 pages, European Patent Office, Rijswijk, Netherlands.

(Continued)

*Primary Examiner* — Philip F Gabler
(74) *Attorney, Agent, or Firm* — Marshall & Melhorn, LLC (57) ABSTRACT

A height-adjustable headrest may have a base support element and a supporting element. The supporting element may be arranged in the base support element. The supporting element may be guidable in a longitudinally displaceable manner in an X direction. In order to form a guide, the basic supporting element may have a number of openings and the supporting element may have a number of guide parts. A (Continued)

shape of the number of openings may correspond to a shape of the number of guide parts.

8 Claims, 7 Drawing Sheets

(56) References Cited

U.S. PATENT DOCUMENTS

| | | | | |
|---|---|---|---|---|
| 7,878,596 | B2* | 2/2011 | Brunner | B60N 2/832 |
| | | | | 297/410 |
| 8,348,348 | B2 | 1/2013 | Eckstein et al. | |
| 9,555,727 | B2* | 1/2017 | Kotz | B60N 2/806 |
| 2011/0109144 | A1* | 5/2011 | Eckstein | B60N 2/865 |
| | | | | 297/409 |
| 2012/0025582 | A1* | 2/2012 | Humer | B60N 2/85 |
| | | | | 297/391 |
| 2020/0062156 | A1* | 2/2020 | Little | B60N 2/829 |
| 2021/0155134 | A1* | 5/2021 | Mihm | B60N 2/876 |

FOREIGN PATENT DOCUMENTS

| | | |
|---|---|---|
| JP | S61129554 A | 6/1986 |
| WO | WO/2010123503 A1 | 10/2010 |

OTHER PUBLICATIONS

The International Bureau of WIPO, International Preliminary Report on Patentability (Chapter 1), issued in PCT/EP2019/064752, dated Dec. 15, 2020, 16 pages, The International Bureau of WIPO, Geneva, Switzerland.

\* cited by examiner

HEIGHT-ADJUSTABLE AND LONGITUDINALLY ADJUSTABLE HEADREST

The invention relates to a height-adjustable headrest.

Various height-adjustable headrests are known in the prior art.

It is the object of the present invention to specify an improved height-adjustable headrest.

The object is achieved according to the invention with a height-adjustable headrest which comprises the features specified in claim 1.

A headrest is height-adjustable. According to the invention, the headrest has a basic supporting element and a supporting element, which is arranged in the latter and is guidable in a longitudinally displaceable manner in an X direction. The supporting element serves for receiving a padded part. According to the invention, in order to form a guide, the basic supporting element comprises a number of openings and the supporting element comprises a number of guide parts, wherein a shape of the number of openings corresponds to a shape of the number of guide parts.

The advantages achieved with the invention consist in that a padded part of the height-adjustable headrest can also be adjusted in a particularly simple manner in the longitudinal direction of the vehicle, and in that the headrest has a particularly compact construction. By means of the headrest according to the invention, comfort during use of same and safety for a vehicle occupant are improved.

A refinement of the headrest according to the invention according to a first alternative makes provision for the supporting element to be electromotively longitudinally displaceable in relation to the basic supporting element by means of a first motor. The aforementioned advantages can thereby be achieved in a particularly simple and convenient manner.

In this first alternative, it is preferably provided that, in order to form the guide, the basic supporting element comprises a number of openings, in particular two openings, and the supporting element comprises a number of guide parts, in particular two guide parts. The supporting element can thereby be displaced particularly readily in the longitudinal direction in the basic supporting element.

In a refinement of the first alternative, it is provided that a first rack element is arranged on a guide part, said rack element interacting with a first pinion, wherein the pinion is arranged on a first shaft which can be driven by means of the first motor. The electromotive longitudinal adjustment is thereby made possible in a particularly simple manner and particularly preferably in a self-locking manner.

Particularly preferably, a first rack element is in each case arranged here on two guide parts, wherein a pinion is in each case arranged at two ends of the first shaft. Each of the two pinions interacts here with one of the first rack elements.

A refinement of the invention provides electromotive height-adjustability. The headrest is thereby of particularly high quality and is comfortable.

A second motor for the electrical height adjustment, and a second shaft, which can be driven by means of the second motor and at the ends of which a number of second pinions are arranged, are preferably provided here. The number of second pinions can be brought or is brought into interaction with racks which are arranged on rods to which the headrest can be fastened or is fastened. The headrest is thereby height-adjustable in a particularly simple and safe manner.

A refinement of the headrest according to the invention according to a second alternative makes provision for the supporting element to be longitudinally displaceable manually in relation to the basic supporting element. The aforementioned advantages can thereby be obtained in a structurally particularly simple and therefore cost-effective manner.

In this second alternative, it is preferably provided that in order to form the guide, the basic supporting element comprises precisely one opening and the supporting element comprises precisely one guide part, wherein the opening comprises a number of elevations, which number corresponds to a number of recesses in the guide part. The supporting element is thereby longitudinally displaceable in a particularly simple manner and with particularly great security against inadvertent tilting in the basic supporting element.

In a refinement of the second alternative, a locking element is provided for locking the supporting element in relation to the basic supporting element, wherein the locking element can be brought into an arresting position by means of an arresting spring. In addition, a manually operable unlocking element is provided here, with which the locking element, by overcoming a spring force of the arresting spring, can be moved out of the arresting position into a non-arresting position. This permits a mechanically very simple arresting of the supporting element in a multiplicity of different positions of the longitudinal displacement and a mechanically very simple release of said arresting in order to undertake a change in the longitudinal adjustment. Upon manual actuation of the unlocking element, a mechanical longitudinal adjustability is thus made possible and, when the unlocking element is released, the supporting element is automatically locked in relation to the basic supporting element by spring force, i.e. is fixed in the longitudinal direction.

BRIEF DESCRIPTION OF THE DRAWINGS

Two exemplary embodiments of the invention are explained in more detail with reference to drawings, in which.

Mutually corresponding parts are provided with the same reference signs in all of the figures.

DETAILED DESCRIPTION

Figure 1:
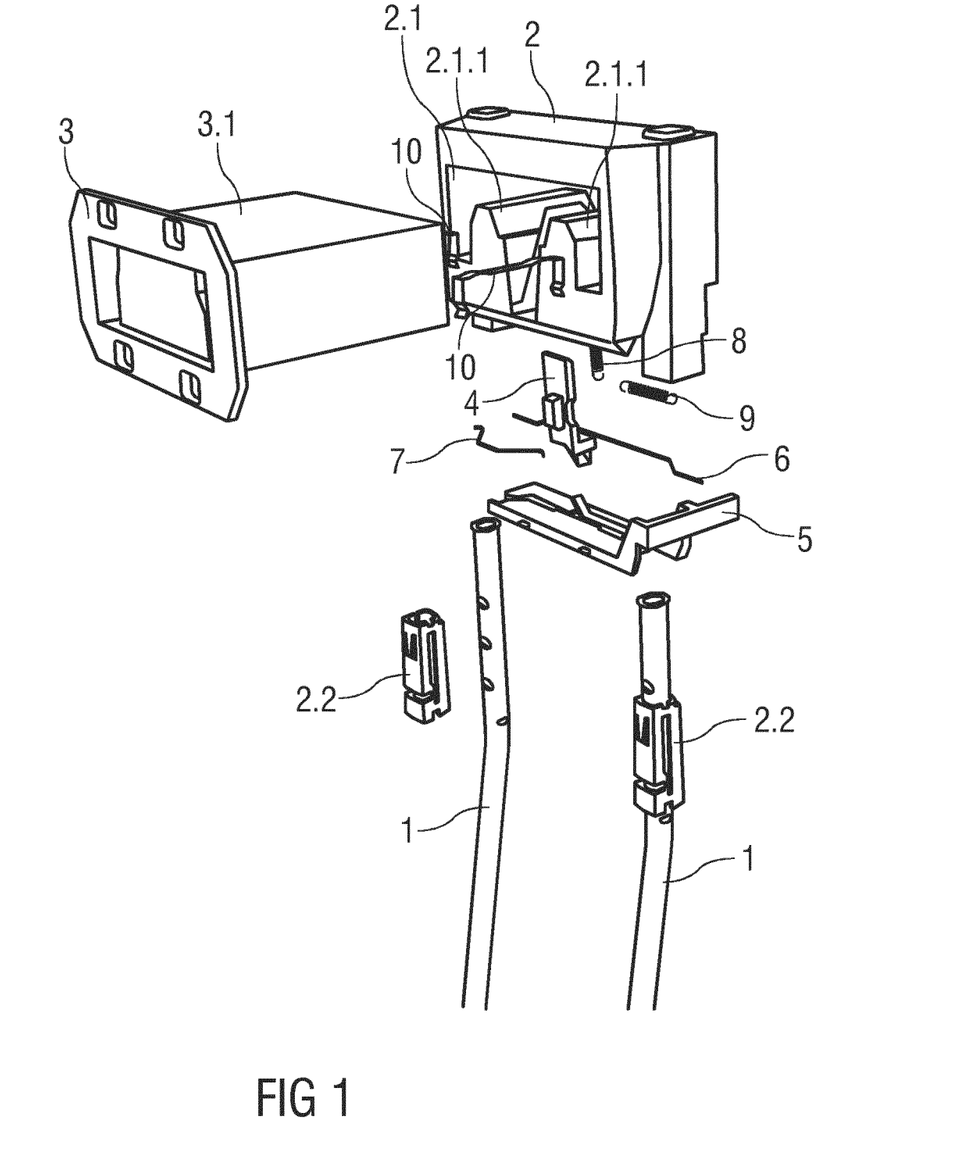
FIG. 1 shows a perspective exploded illustration of a first embodiment of a height-adjustable headrest according to the invention.

FIG. 1 shows a perspective exploded illustration of a first embodiment of a height-adjustable headrest according to the invention. This figure shows two rods 1 which belong to a vehicle seat and serve for accommodating the headrest which is height-adjustable, i.e. is adjustable in the Z direction. Said headrest comprises a basic supporting element 2 which is preferably formed from plastic and has a preferably continuous opening 2.1 arranged in the longitudinal direction of the vehicle, i.e. in the X direction. The basic supporting element 2 comprises two separate sleeves 2.2, wherein in each case one sleeve 2.2 is assigned to one rod 1, with which sleeves the basic supporting element 2 is adjustable on the rods 1 in the Z direction, i.e. is height-adjustable, by the sleeves 2.2 being displaceable, at least in a non-arrested state, on the rods 1. Two optional elevations 2.1.1 are formed in the opening 2.1 in the basic supporting element 2, the elevations serving for guiding a supporting element 3 which is inserted into the opening 2.1 and is longitudinally displaceable, i.e. displaceable in the X direction. For this purpose, the supporting element 3 has, in a guide part 3.1, two lower-side recesses which correspond in shape and position to the elevations 2.1.1.

The headrest also comprises a central locking element 4, with which the supporting element 3 can be locked, i.e. can be fixed, in relation to the basic supporting element 2, and/or the basic supporting element 2 can be locked, i.e. can be fixed, in relation to the rods 1. By means of an unlocking element 5 which can be operated manually and which is also referred to as a lock shift and which interacts with the locking element 4, the supporting element 3 can be unlocked in relation to the basic supporting element 2 and/or the basic supporting element 2 can be unlocked in relation to the rods 1. For this purpose, i.e. for the locking and for the unlocking, an arresting spring 6 produces an interaction between the locking element 4 and the sleeves 2.1. An optional assisting spring 7 serves to assist a movement, preferably to assist a forwardly directed displacement of the unlocked supporting element 3 in relation to the basic supporting element 2. In addition, an optional spring 8 and/or an optional tension spring 9 are/is provided. The spring 8 and/or the tension spring 9 serve/serves preferably for resetting the unlocking element 5 into its basic position to provide a locked state. During manual actuation of the unlocking element 5, a spring force of the spring 8 and/or of the tension spring 9 therefore has to be counteracted.

The headrest also comprises a number of supporting element springs 10, preferably two or four supporting element springs 10.

Figure 2:
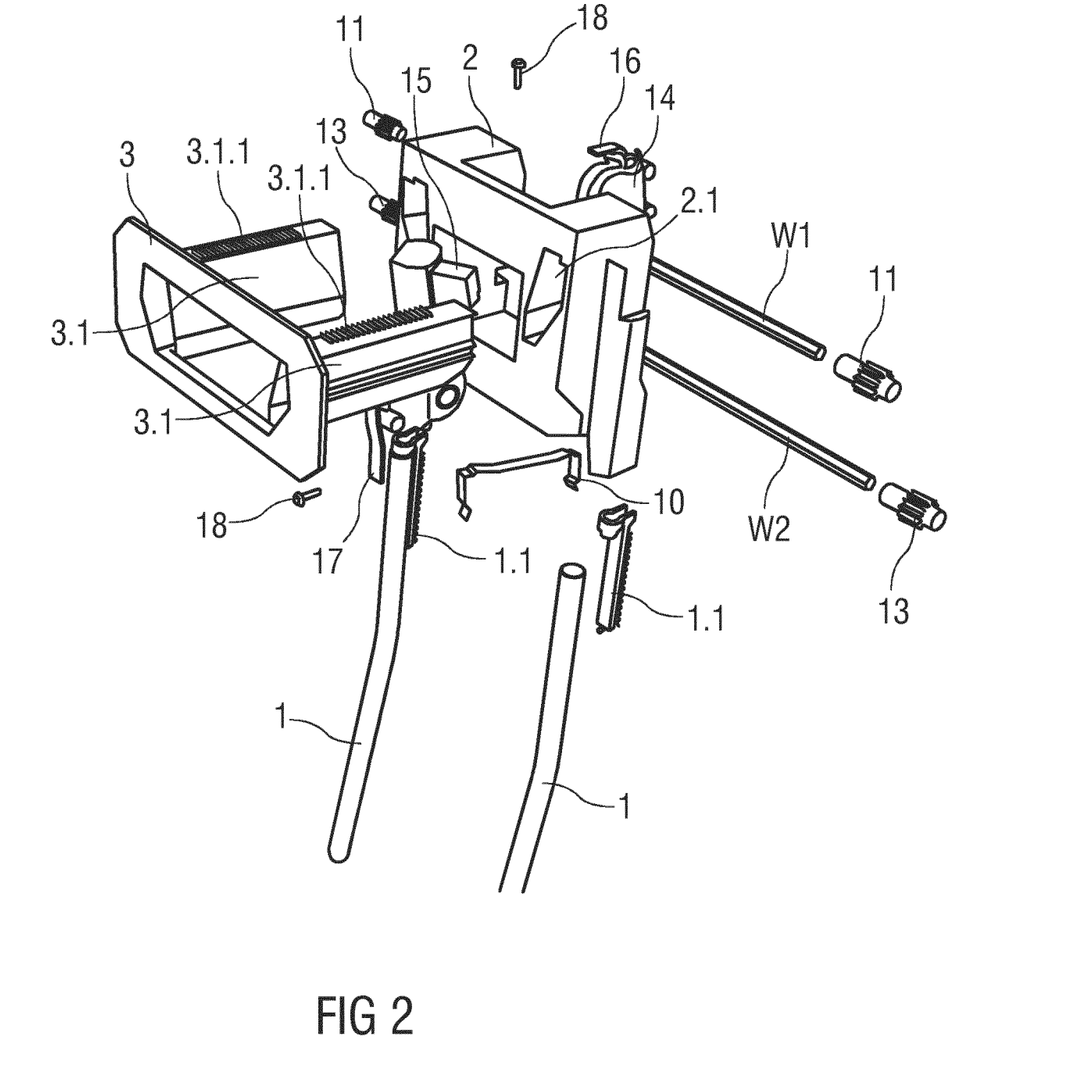
FIG. 2 shows a perspective exploded illustration of a second embodiment of the height-adjustable headrest according to the invention.

FIG. 2 shows a perspective exploded illustration of a second embodiment of a height-adjustable headrest according to the invention. This figure likewise shows two rods 1 which belong to the vehicle seat, not completely shown, and which serve for accommodating the headrest which is height-adjustable, i.e. is adjustable in the Z direction. This headrest comprises the basic supporting element 2 which is preferably formed from plastic and has two continuous openings 2.1 in the longitudinal direction of the vehicle, i.e. in the X direction. The basic supporting element 2 is adjustable in a motorized manner in the Z direction on the rods 1, i.e. is height-adjustable in a motorized manner.

The two openings 2.1 in the basic supporting element 2 form a guide of the supporting element 3 which is inserted into the openings 2.1 and is longitudinally displaceable, i.e. displaceable in the X direction. For this purpose, two guide parts 3.1 of the supporting element 3 correspond in their shape to the two openings 2.1. Each guide part 3.1 has upper-side first rack elements 3.1.1 which serve for the longitudinal displaceability. In each case one rack 1.1 which serves for the height-displaceability is arranged on and fastened to each upper end of the rods 1.

The headrest also comprises supporting element springs 10.

In addition, the headrest comprises a first shaft W1 which is preferably in the form of a hexagon and which can be driven electromotively. First pinions 11 are attached to the outer ends of the first shaft W1, i.e. are arranged in a form-fitting manner. The first pinions 11 are operatively connected to the first rack elements 3.1.1 such that the longitudinal displaceability of the supporting element 3 can be brought about by rotation of the first shaft W1. Said drive is preferably self-locking.

In addition, the headrest comprises a second shaft W2 which is preferably in the form of a hexagon and which can be driven electromotively. Second pinions 13 are attached to the outer ends of the second shaft W2, i.e. are arranged in a form-fitting manner. The second pinions 13 are operatively connected to the racks 1.1 such that the height-adjustability of the supporting element 3 can be brought about by rotation of the second shaft W2. Said drive is preferably self-locking.

A first motor 14 of the headrest serves for driving the first shaft W1 and therefore for the longitudinal displaceability of the supporting element 3. A second motor 15 of the headrest serves for driving the second shaft W2 and therefore for the height displaceability of the headrest. The first motor 14 is fastened preferably to the basic supporting element 2 by means of a first motor mount 16 and the second motor 15 is fastened likewise preferably to the basic supporting element 2 by means of a second motor mount 17.

In addition, the headrest comprises screws 18 with which the motors 14, 15 are fastened to the basic supporting element 2.

Figure 3:
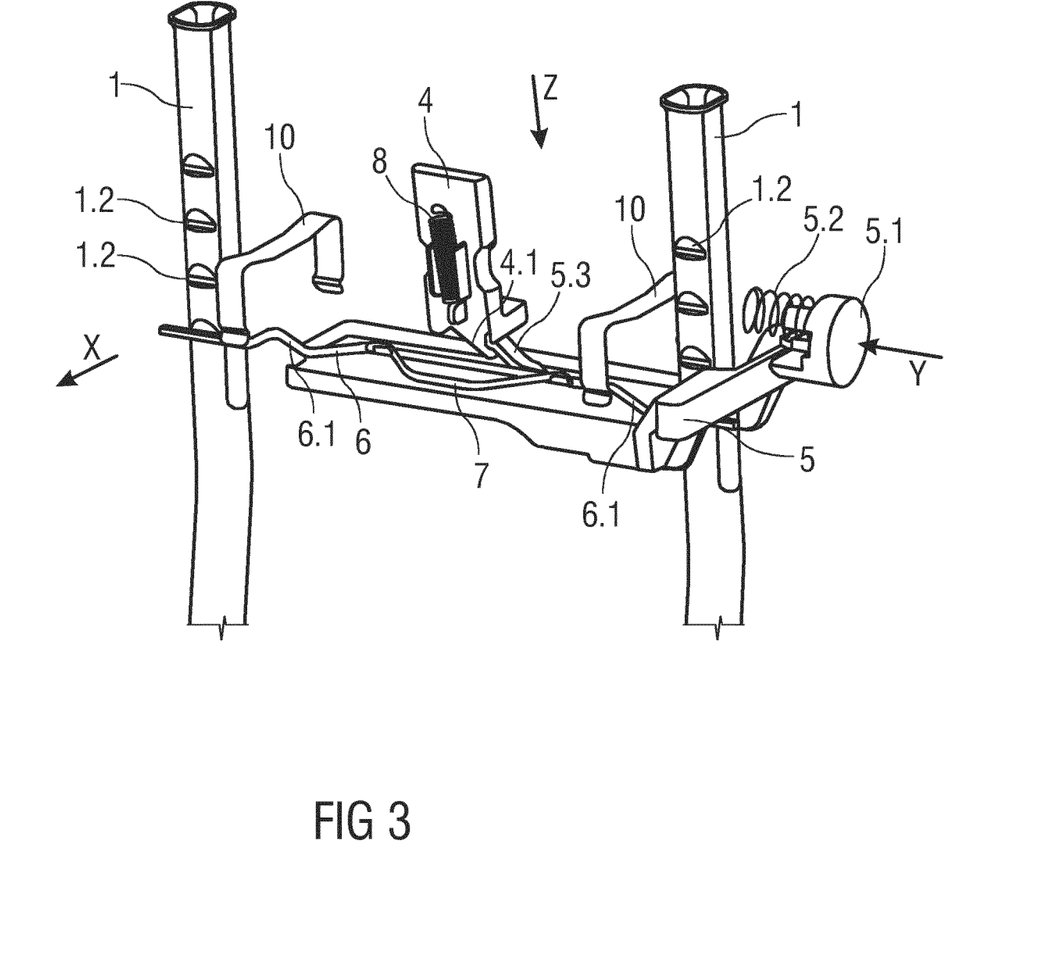
FIG. 3 shows a schematic detailed view of the headrest from FIG. 1.

FIG. 3 shows a schematic detailed view of the headrest from FIG. 1. FIGS. 4, 5, 6 and 7 are schematic sectional illustrations of the headrest from FIG. 1. An actuating button 5.1 can be arranged on the unlocking element 5 in order to move the unlocking element 5 in the Y direction, that is to say in the transverse direction of the vehicle. Optionally, a resetting spring 5.2 can be provided for resetting the actuating button 5.1 and/or the unlocking element 5 counter to the actuating direction. If the unlocking element 5, with or without an actuating button, is moved toward the basic supporting element 2 in the Y direction, the components fastened thereto—the locking element 4 and arresting spring 6—move simultaneously. The locking element 4 has a ramp 4.1 which is in engagement with a ramp 5.3 on the unlocking element 5 in such a manner that the locking element 4 is displaced downward in the Z direction when the unlocking element 5 is displaced in the Y direction toward the basic supporting element 2. Alternatively, it is also possible for only one of the ramps 4.1, 5.3 to be provided on one of the elements—the locking element 4 and the unlocking element 5—and to be in engagement with a surface on the respective other of the elements—the locking element 4 and unlocking element 5.

Figure 6:
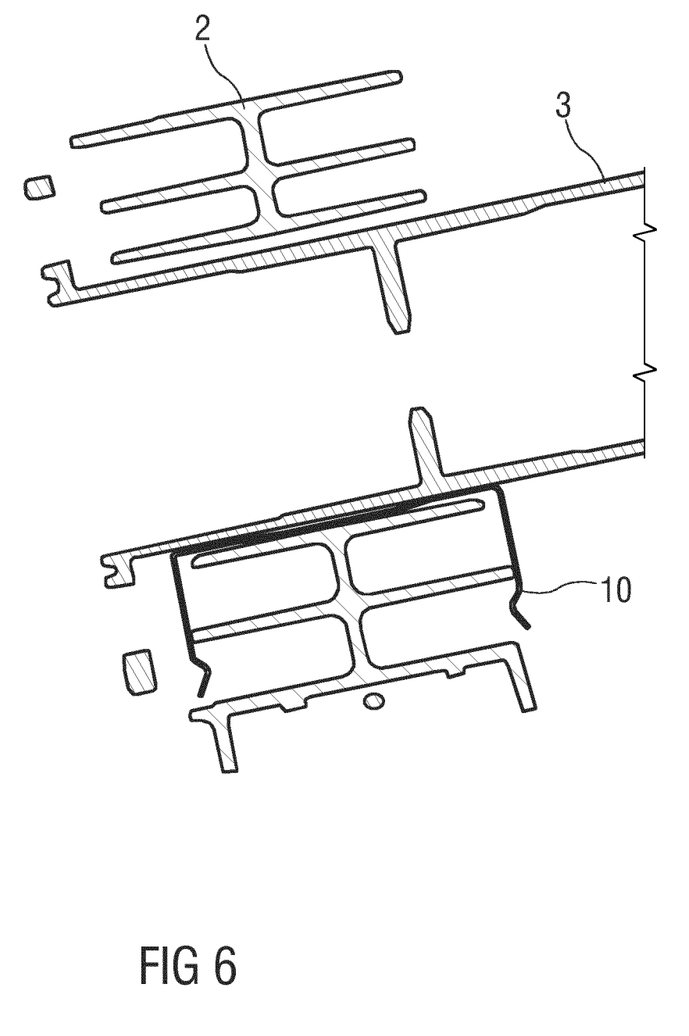
FIG. 6 shows a further schematic sectional illustration of the headrest from FIG. 1.

By means of the movement of the locking element 4 downward in the Z direction, the longitudinally displaceable supporting element 3 is unlocked such that it can be moved in the X direction. FIG. 6 shows that the locking element 4 engages, prior to the actuation of the unlocking element 5, in one of a plurality of latching grooves 3.2, arranged successively in the X direction, in the longitudinally displaceable supporting element 3 such that the longitudinally displaceable supporting element 3 is arrested in the X direction. The spring 8 holds the locking element 4 in this position. At least some of the latching grooves 3.2 can be formed obliquely on one side, for example rearward in the X direction, such that the longitudinally displaceable supporting element 3 can be moved forward in the X direction even without actuation of the unlocking element 5. During such a movement, the locking element 4 is in each case pushed by the slope out of the latching groove 3.2 and, by means of the force of the spring 8, latches into the following latching groove 3.2. When the unlocking element 5 is actuated, the locking element 4 is moved downward in the Z direction out of engagement with the latching grooves 3.2 such that the longitudinally displaceable supporting element 3 can be moved freely in the X direction.

Figure 4:
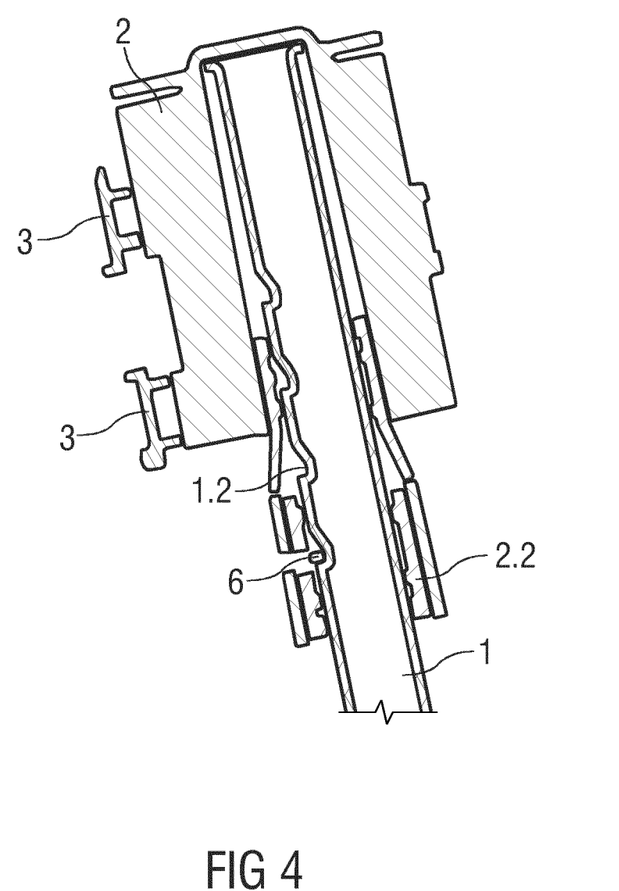
FIG. 4 shows a schematic sectional illustration of the headrest from FIG. 1.
Figure 5:
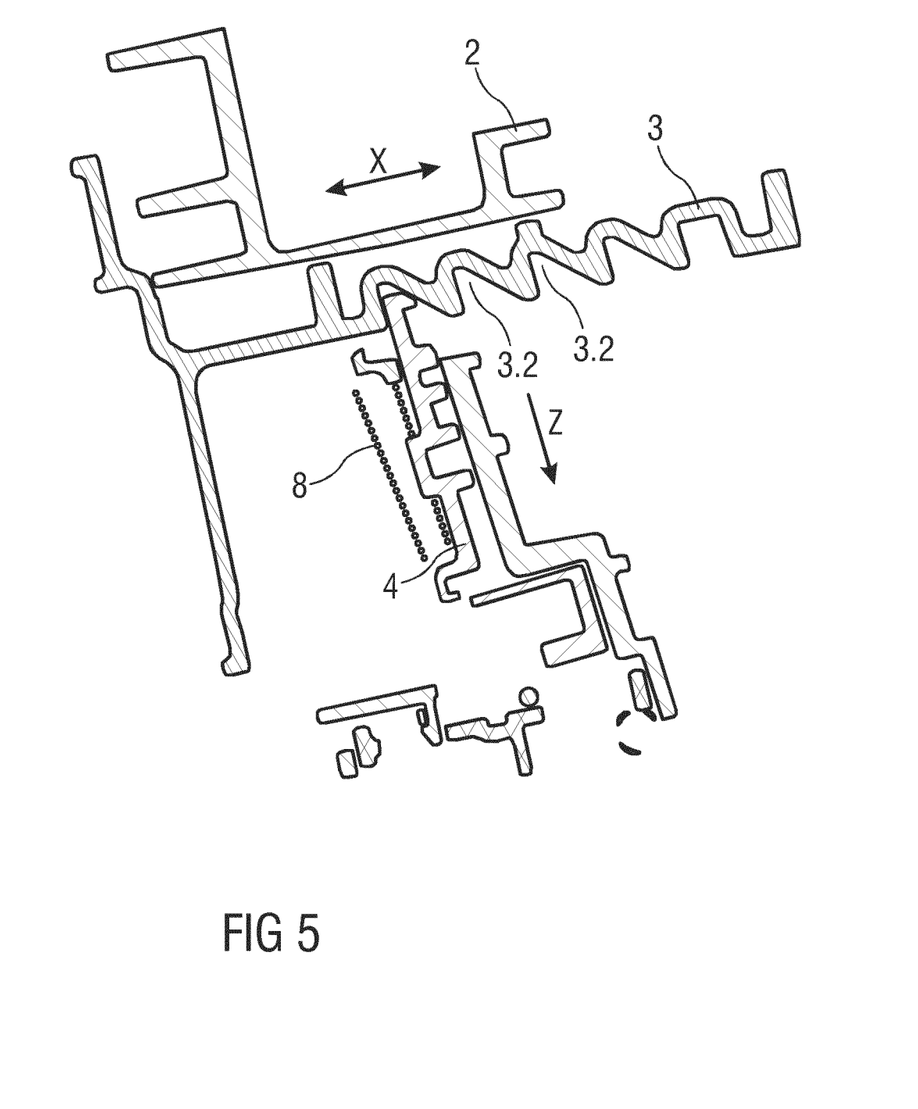
FIG. 5 shows a further schematic sectional illustration of the headrest from FIG. 1.

The arresting spring 6 is latched in one of a plurality of successive latching depressions 1.2 on each of the rods 1 without actuation of the unlocking element 5. This is illustrated in FIG. 4. At least some of the latching depressions 1.2 can be formed obliquely on one side, for example upward in the Z direction, such that the basic supporting element 2 can be moved upward in the Z direction even without actuation of the unlocking element 5. During such a movement, the arresting spring 6 is in each case pushed by the slope out of the latching depression 1.2 and, by means of its own elasticity, latches into the following latching depression 1.2. The arresting spring 6 has one or more oblique portions 6.1 which are in engagement with the unlocking element 5 in such a manner that, when the unlocking element 5 is actuated in the Y direction toward the basic supporting element 2, the arresting spring 6 is moved away from the rods 1 in the X direction, for example forward, and in particular is moved out of the engagement with the latching depressions 1.2 such that the basic supporting element 3 can be moved freely in the Z direction.

Figure 7:
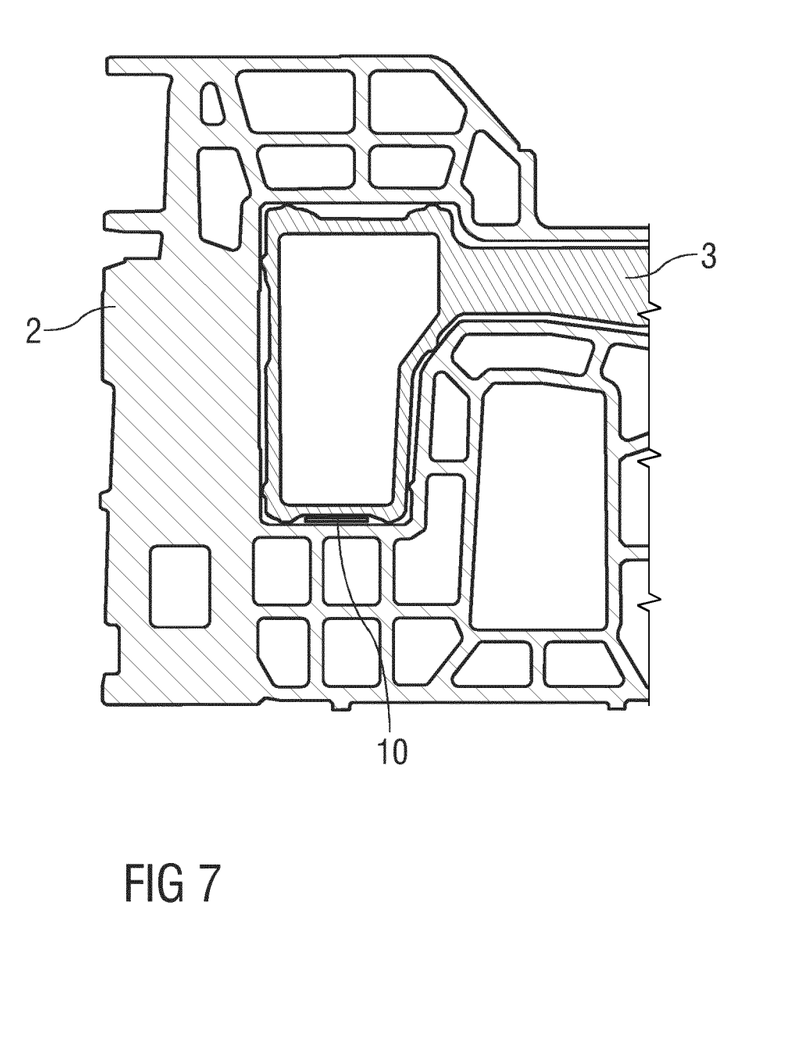
FIG. 7 shows a further schematic sectional illustration of the headrest from FIG. 1.

The supporting element springs 10 are fastened to one of the elements—the basic supporting element 2 or the longitudinally displaceable supporting element 3—and serve as spacers from the respective other of the elements—the basic supporting element 2 or the longitudinally displaceable supporting element 3—which is guided with respect thereto. In this manner, free play between the basic supporting element 2 and the longitudinally displaceable supporting element 3 is reduced and corresponding noises, in particular rattling, are reduced. FIGS. 6 and 7 show by way of example an arrangement of the supporting element springs 10 on the basic supporting element 2. The supporting element springs 10 serve for the same purpose in the embodiment according to FIG. 2.

LIST OF REFERENCE SIGNS

1 Rods
1.1 Racks
1.2 Latching depression
2 Basic supporting element
2.1 Opening
2.1.1 Elevation
2.2 Sleeve
3 Longitudinally displaceable supporting element
3.1 Guide part
3.1.1 First rack element
3.2 Latching groove
4 Locking element
4.1 Ramp
5 Unlocking element
5.1 Actuating button
5.2 Resetting spring
5.3 Ramp
6 Arresting spring
6.1 Oblique portion
7 Assisting spring
8 Spring
9 Tension spring
10 Supporting element spring
11 First pinions
13 Second pinions
14 First motor
15 Second motor
16 First motor mount
17 Second motor mount
18 Screw
W1 First shaft
W2 Second shaft

What is claimed is:

1. A headrest, comprising:
a basic supporting element and a supporting element, the supporting element is arranged in the basic supporting element and is guidable in a longitudinally displaceable manner in an X direction,
wherein, in order to form a guide, the basic supporting element includes at least one opening and the supporting element includes at least one guide part,
wherein a shape of the at least one opening corresponds to a shape of the least one guide part, wherein the at least one guide part has an upper surface with a first rack element oriented substantially horizontally thereon, at least one outer side surface, a first angled inner side surface and a second angled inner side surface being nonplanar with the first angled inner side surface,
wherein the supporting element is electromotively longitudinally displaceable relative to the basic supporting element via a first motor located in the headrest,
wherein the first rack element interacts with at least one first pinion, wherein the at least one first pinion is arranged on a first substantially horizontally oriented shaft which is driven by the first motor,
a second motor for electromotive height-adjustment,
a second shaft, located below but parallel with the first shaft, which is driven via the second motor,
wherein each end of the second shaft includes a second pinion disposed thereon,
wherein each second pinion is configured to interact with at least one second rack,
wherein the at least one second rack is arranged on at least one rod, wherein said at least one second rack and said at least one rod are oriented substantially vertically, and
wherein the headrest is movably coupled to the at least one rod.

2. The headrest as claimed in claim 1, wherein said headrest has electromotive height-adjustability.

3. The headrest as claimed in claim 1, wherein the first motor is coupled to the basic supporting element.

4. The headrest as claimed in claim 1, wherein the second motor is coupled to the basic supporting element.

5. The headrest as claimed in claim 4, wherein at least one of the first motor and the second motor is directly coupled to the basic supporting element by at least one motor mount.

6. A headrest, comprising:
a basic supporting element and a supporting element, the supporting element is arranged in the basic supporting element and is guidable in a longitudinally displaceable manner in an X direction,
wherein, in order to form a guide, the basic supporting element includes at least one opening and the supporting element includes at least one guide part having at least one first rack arranged substantially horizontally thereon,
wherein a shape of the at least one opening of the basic supporting element corresponds to a shape of the least one guide part of the supporting element, wherein said at least one opening is defined by first and second lower walls, wherein said lower walls are connected to first and second non-parallel upper walls, wherein said upper walls connect to a notch adapted to receive the at least one first rack, wherein the supporting element is electromotively longitudinally displaceable relative to the basic supporting element via a first motor located in the headrest, wherein the at least one first rack element is configured to interact with at least one first pinion, and wherein the at least one first pinion is arranged on a first shaft driven by the first motor, wherein the at least one first pinion is arranged on a first substantially horizontally oriented shaft which is driven by the first motor, a second motor for electromotive height-adjustment, a second shaft, located below but parallel with the first shaft, which is driven via the second motor, wherein each end of the second shaft includes a second pinion disposed thereon, wherein each second pinion is configured to interact with at least one second rack, wherein the at least one second rack is arranged on at least one rod, wherein said at least one second rack and said at least one rod are oriented substantially vertically, and wherein the headrest is movably coupled to the at least one rod.

7. The headrest of claim 1, wherein said at least one outer side surface has at least one rib extending transversely therefrom.

8. The headrest of claim 7, wherein two ribs located on said at least one outer side surface extend along said side surface generally parallel one another.

* * * * *